United States Patent
Takamizawa et al.

[11] 3,898,256
[45] Aug. 5, 1975

[54] METHOD FOR THE PREPARATION OF 1,1,3,3,-TETRAMETHYLDISILOXANE

[75] Inventors: Minoru Takamizawa; Toshio Shinohara; Yoshiaki Nishimura, all of Annaka, Japan

[73] Assignee: Shinetsu Chemical Company, Tokyo, Japan

[22] Filed: Mar. 28, 1974

[21] Appl. No.: 455,951

[30] Foreign Application Priority Data
Mar. 31, 1973 Japan.................. 48-37160

[52] U.S. Cl. ................. 260/448.2 E; 260/448.2 R; 260/448.8 R; 260/46.5 R
[51] Int. Cl. ................................. C07f 7/08
[58] Field of Search ............... 260/448.2 E, 448.2 R

[56] References Cited
UNITED STATES PATENTS

| | | | |
|---|---|---|---|
| 2,386,793 | 10/1945 | Hanford ................. | 260/448.2 E X |
| 2,521,390 | 9/1950 | Meadowcroft et al... | 260/448.2 E X |
| 3,584,027 | 6/1971 | Damle et al................. | 260/448.2 E |

*Primary Examiner*—Paul F. Shaver
*Attorney, Agent, or Firm*—Toren, McGeady and Stanger

[57] ABSTRACT

1,1,3,3-Tetramethyldisiloxane

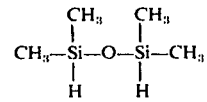

can be prepared efficiently with high yield by the reaction of organohydrogen polysiloxanes having methylhydrogen siloxy unit

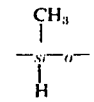

in the structure
with methyl Grignard reagent $CH_3MgX$ in dialkyl ether solvent and followed by hydrolysis of the reaction product.

9 Claims, No Drawings

METHOD FOR THE PREPARATION OF 1,1,3,3-TETRAMETHYLDISILOXANE

FIELD OF THE INVENTION

This invention relates to an improved method for the preparation of 1,1,3,3-tetramethyldisiloxane represented by the structural formula

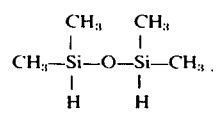

DESCRIPTION OF THE PRIOR ART

This compound is useful as an important intermediate disiloxane as a stopper which introduces terminal groups having Si-H bond into the organopolysiloxane structure of various kinds of silicone products such as silicone fluids, silicone elastomers, silicone varnishes, and those having modified organopolysiloxane ingredients. Several methods are known for its preparation. For example, dimethylchlorosilane with relatively low purity, obtained in the preparation of dimethyldichlorosilane by the so-called direct synthesis process and containing as the impurities several kinds of unsaturated hydrocarbons with boiling points close to that of dimethylchlorosilane, is hydrolyzed to give 1,1,3,3-tetramethydisiloxane. The yield of the disiloxane is very low due to the difficulty of the separation of the disiloxane from the unsaturated hydrocarbon impurities, especially those formed by the addition of hydrogen chloride thereto, by distillation.

Alternatively, the disiloxane is prepared by the hydrolysis of dimethylchlorosilane obtained by the reduction of dimethyldichlorosilane with lithium aluminum hydride. However, the cost for the production of the disiloxane by this process is very high because of the non-selectivity of the reduction reaction along with the high price of the reducing agent, lithium aluminum hydride.

OBJECT OF THE INVENTION

The object of the present invention is to present a novel method suitable for the commercial-scale production of 1,1,3,3-tetramethyldisiloxane with the above-mentioned problems entirely eliminated.

SUMMARY OF THE INVENTION

To describe the method in further detail, organohydrogen polysiloxanes, having at least one methylhydrogen siloxy unit

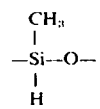

in a molecule, are employed as the starting material and they are subjected to reaction with methyl Grignard reagent represented by the general formula $CH_3MgX$, where X denotes chlorine, bromine or iodine atom. The the reaction mixture is subjected to hydrolysis without isolating the intermediate

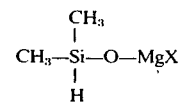

to directly give the end product 1,1,3,3-tetramethyldisiloxane.

The reactions taking place in the above process are summarized as:

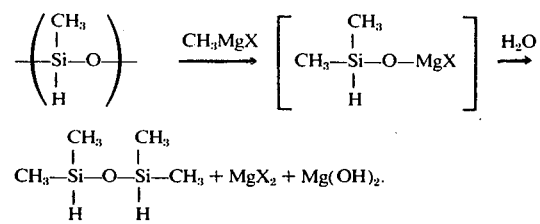

To further explain the reaction process, it is characterized in that the organohydrogen polysiloxane having at least one methylhydrogen siloxy unit in a molecule is subjected to the reaction with the methyl Grignard reagent in a dialkyl ether solvent or a mixed solvent of a dialkyl ether with other organic solvents inert to the Grignard reagent and then the reaction mixture is subjected to hydrolysis. The method gives a possibility of obtaining 1,1,3,3-tetramethyldisiloxane of the purpose very easily with low cost owing to the high yield of the product and the simplicity of the process.

The starting material employed in the method of the present invention is any one of the organopolysiloxanes having at least one methylhydrogen siloxy unit

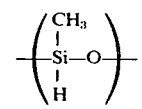

in a molecule and the mixtures thereof.

They are exemplified by the cyclic methylhydrogen polysiloxanes such as 1,3,5,7-tetramethylcyclotetrasiloxane, 1,3,5,7,9-pentamethylcyclopentasiloxane, 1,3,5,7,9,11-hexamethylcyclohexasiloxane, 1,3,5,7,9,-11,13-heptamethylcycloheptasiloxane and 1,3,5,7,9,1-1,13,15-octamethylcyclooctasiloxane, branched or unbranched linear organohydrogen polysiloxanes having various kinds of triorganosilyl terminal groups, such as

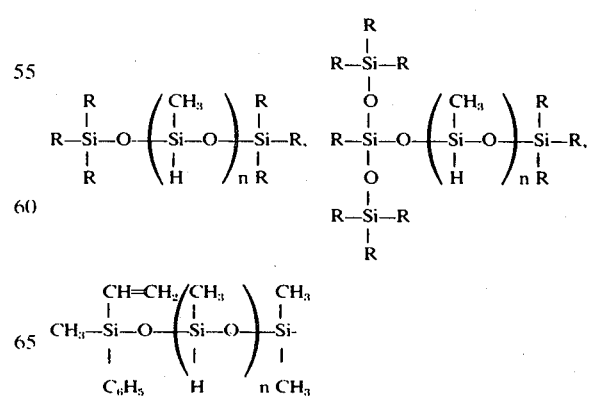

and

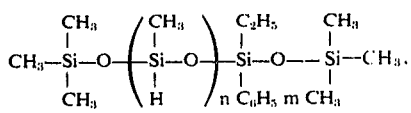

where $n$ and $m$ denote positive integers, $n$ being from 5 to 2,000 and R represents one or more of monovalent hydrocarbon groups such as methyl, ethyl, propyl, phenyl and vinyl groups.

The organohydrogen polysiloxanes above mentioned can be easily prepared by the hydrolysis of methyldichlorosilane alone or the co-hydrolysis with other organochlorosilanes followed by equilibration of the hydrolysis products, if desired, by use of an equilibration catalyst such as sulfuric acid.

The methyl Grignard reagent to be reacted with the above-defined organohydrogen polysiloxanes is selected from the group consisting of methylmagnesium chloride, methylmagnesium bromide and methylmagnesium iodide. The process for the preparation of the methyl Grignard reagent is a conventional one, wherein metallic magnesium shavings or powders dispersed in dialkyl ether solvent or a mixed solvent thereof with other organic solvents inert to the Grignard reagent react with methyl halide introduced into the reaction mixture at or below the boiling point of the solvent employed.

The mole ratio of the methyl Grignard reagent to the organohydrogen polysiloxane r, expressed by

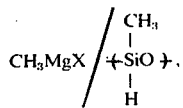

in the reaction is adequately selected between 1 and 2. When the $r$ value is smaller than unity, the yield of the disiloxane of the purpose is decreased considerably and when the $r$ value is larger than 2, an undesirable side reaction takes place by which the SiH groups are converted into $SiCH_3$ groups and which also leads to the lowering of the yield of the disiloxane.

The dialkyl ether solvent employed in the reaction of the present method is exemplified by diethyl ether, diisopropyl ether or dibutyl ether. The amount of the ether to be employed is preferably in excess over the equivalent amount for the complex formation with the methyl Grignard reagent; i.e. the mole ratio ether/Mg, $r'$, should be equal to or larger than unity.

On the other hand, the inert organic solvents employed in a mixed solvent with said dialkyl ether are exemplified by several kinds of hydrocarbons such as benzene, toluene, xylene, n-hexane and cyclohexane. These inert solvents serve as the diluent for controlling the reaction velocity. Therefore, the amount of them or the mixing ratio of them with the dialkyl ether should be determined with the consideration of the reactivity between the organohydrogen polysiloxane and the Grignard reagent.

In carrying out the process of the present invention, the methyl Grignard reagent, prepared conventionally in the dialkyl ether solvent or the mixed solvent, is added dropwise to the polysiloxane or the latter to the former. The reaction temperature in this case is below the boiling point of the solvent and preferably between −70°C and +30°C. When the temperature is above this range, the undesirable side reaction of SiH to $SiCH_3$ is apt to take place and when the temperature is below this range, the reaction velocity becomes unpractically small.

The next step of the process is the hydrolysis of the reaction product obtained above to produce the product 1,1,3,3-tetramethyldisiloxane. The hydrolysis is carried out by adding to the reaction mixture a sufficient amount of water or diluted aqueous solution of hydrochloric acid, acetic acid, an alkali hydroxide such as sodium hydroxide or potassium hydroxide, or alkali carbonate such as sodium carbonate or potassium carbonate. The temperature during the hydrolysis reaction is below the boiling point of the dialkyl ether employed as the solvent, or preferably below 30°C.

The reaction mixture after the hydrolysis is dried and then subjected to rectification to give pure 1,1,3,3-tetramethyldisiloxane.

EXAMPLE 1

Fourty-nine grams (2 moles) of metallic magnesium powder was placed in a four-necked flask of 2-liter volume and dried in nitrogen atmosphere by elevating the temperature up to 120°C. After cooling, 400 g of dibutyl ether and 100 mg of iodine as a reaction accelerator were added to the flask and the reaction was undertaken for 8 hours at 55°C by introducing 1.3 times of the theoretical amount of methyl chloride into the reaction mixture. There obtained was a gray slurry of methylmagnesium chloride-dibutyl ether mixture.

Into the above Grignard mixture diluted with 300 g of toluene, a mixture of 99 g of 1,3,5,7-tetramethylcyclotetrasiloxane and 50 g of toluene was added dropwise with stirring over a period of 1.5 hours while keeping the temperature below 7°C. Stirring was continued for 1 hour after the completion of the addition. Then 500 g of hydrochloric acid (17.5% HCl) was added over a period of 30 minutes with the temperature kept below 10°C. While maintaining the temperature below 10°C, the reaction mixture was stirred for additional 30 minutes. The upper layer of the reaction mixture separated out on standing, was dried and then subjected to rectification to give 76 g of 1,1,3,3-tetramethyldisiloxane having boiling point 72°C, density $d_4^{25}$ 0.7545 and refractive index $n_D^{25}$ 1.3700. The yield was 69% of the theoretical.

EXAMPLE 2

Methylmagnesium iodide was prepared in diethyl ether as the solvent and 1,3,5,7,9,11-hexamethylcyclohexasiloxane was employed instead of 1,3,5,7-tetramethylcyclotetrasiloxane as the starting organohydrogen polysiloxane without the dilution by toluene. Otherwise the reaction was undertaken similarly as in the preceding example and 1,1,3,3-tetramethyldisiloxane was obtained in 95.2% yield.

EXAMPLE 3

The methyl Grignard reagent employed here was methylmagnesium bromide and the starting organohydrogen polysiloxane was the methylhydrogen polysiloxane expressed by the formula

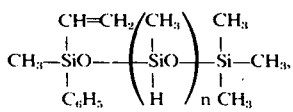

where $n$ had an average value of about 1,000. The procedure of the reaction was substantially the same as in Example 1 and the disiloxane of the purpose was obtained in 85.3% yield.

EXAMPLE 4

The methyl Grignard reagent employed here was methylmagnesium chloride and the starting organohydrogen polysiloxane was the methylhydrogen polysiloxane expressed by the formula

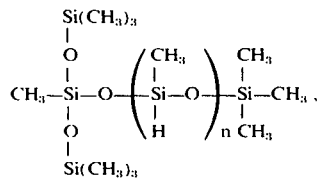

where $n$ had an average value of about 100. The procedure of the reaction was substantially the same as in Example 1 and the disiloxane of the purpose was obtained in 71.1% yield.

EXAMPLE 5

The methyl Grignard reagent employed here was methylmagnesium chloride and the starting organohydrogen polysiloxane was the methylhydrogen polysiloxane expressed by the formula

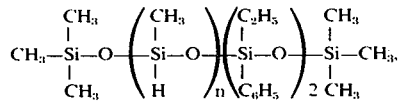

where $n$ had an average value of about 1,000. The procedure of the reaction was substantially the same as in Example 1 and the disiloxane of the purpose was obtained in 65.3% yield.

EXAMPLE 6

The reaction procedure was the same as in Example 1 except that the mixture of 1,3,5,7-tetramethylcyclotetrasiloxane and toluene was added to the Grignard mixture instead of the addition of the latter to the former. The disiloxane of the purpose was obtained in 65% yield.

EXAMPLE 7

The reaction procedure was substantially the same as in Example 1 except that a methylhydrogen polysiloxane with hydrogen gas evolution 370 ml/g, prepared by hydrolyzing methyl dichlorosilane in diethyl ether as the solvent and then removing the ether was used in place of the starting 1,3,5,7-tetramethylcyclotetrasiloxane. The yield of the disiloxane of the purpose was 62%.

What is claimed is:

1. A method for the preparation of 1,1,3,3-tetramethyldisiloxane which comprises reacting an organohydrogen polysiloxane substantially free of Si-Cl linkages and having at least one methylhydrogen siloxy unit in a molecule with a methyl Grignard reagent in a dialkyl ether solvent or in a mixed solvent of a dialkyl ether with organic solvents inert to said Grignard reagent, said organohydrogen polysiloxane being soluble in said solvent, and subjecting the reaction mixture to hydrolysis.

2. The method as claimed in claim 1 wherein said organohydrogen polysiloxane is selected from the group consisting of 1,3,5,7-tetramethylcyclotetrasiloxane, 1,3,5,7,9-pentamethylcyclopentasiloxane, 1,3,5,7,9,11-hexamethylcyclohexasiloxane, 1,3,5,7,9,11,13-heptamethylcycloheptasiloxane and 1,3,5,7,9,11,13,15-octamethylcyclooctasiloxane.

3. The method as claimed in claim 1 wherein said organohydrogen polysiloxane is one of the branched or unbranched linear methylhydrogen polysiloxanes having from 5 to 2,000 methylhydrogen siloxy units in a molecule or mixtures thereof.

4. The method as claimed in claim 1 wherein said methyl Grignard reagent is selected from the group consisting of methylmagnesium chloride, methylmagnesium bromide and methylmagnesium iodide.

5. The method as claimed in claim 1 wherein said dialkyl ether is selected from the group consisting of diethyl ether, diisopropyl ether and dibutyl ether.

6. The method as claimed in claim 1 wherein said organic solvent inert to said methyl Grignard reagent is selected from the group consisting of benzene, toluene, xylene, n-hexane and cyclohexane.

7. The method as claimed in claim 1 wherein the reaction of said organohydrogen polysiloxane and said methyl Grignard reagent is carried out at a temperature from $-70°C$ to $+30°C$.

8. The method as claimed in claim 1 wherein said hydrolysis is carried out at a temperature below $+30°C$.

9. The method as claimed in claim 1 wherein said hydrolysis is carried out by use of water or an aqueous solution of hydrochloric acid, acetic acid, sodium hydroxide, potassium hydroxide, sodium carbonate or potassium carbonate.

* * * * *